United States Patent [19]

De Cleyn et al.

[11] Patent Number: 5,061,473

[45] Date of Patent: Oct. 29, 1991

[54] TITANIUM DIOXIDE, A PROCESS AND ITS PRODUCTION

[75] Inventors: René De Cleyn, Brasschaat, Belgium; Peter Thometzek; Jakob Rademachers, both of Krefeld, Fed. Rep. of Germany

[73] Assignee: Bayer Aktiengesellschaft, Leverkusen, Fed. Rep. of Germany

[21] Appl. No.: 538,075

[22] Filed: Jun. 13, 1990

Related U.S. Application Data

[62] Division of Ser. No. 438,315, Nov. 20, 1989, Pat. No. 5,009,879.

[30] Foreign Application Priority Data

Nov. 29, 1988 [DE] Fed. Rep. of Germany ....... 3840196

[51] Int. Cl.$^5$ .......................................... C01G 23/047
[52] U.S. Cl. .................................... 423/610; 423/615; 423/616
[58] Field of Search ....................... 423/615, 616, 610; 501/134

[56] References Cited

U.S. PATENT DOCUMENTS

| | | | |
|---|---|---|---|
| 2,342,483 | 2/1944 | Olson | 423/616 |
| 2,346,091 | 4/1944 | Stark et al. | 423/616 |
| 2,439,895 | 4/1948 | Keats et al. | 423/615 |
| 3,862,297 | 1/1975 | Claridge et al. | 423/615 |

*Primary Examiner*—Theodore Morris
*Assistant Examiner*—Edward Squillante
*Attorney, Agent, or Firm*—Connolly and Hutz

[57] ABSTRACT

A titanium dioxide composition useful as the opacifier agent for vitreous enamels and fusion enamels comprises $TiO_2$ predominantly in the form of isometric primary particles from 0.5 to 5.0 μm in size, which are aggregated to predominantly spherolithic particles 1 to 100 μm in diameter, with a BET surface of 1 to 4.5 m$^2$/g and an apparent density of 0.2 to 1.3 kg/l, is prepared by subjecting titanium dioxide hydrate having a BET surface of from 50 to 500 m$^2$/g to accelerated calcination at temperatures of 800° to 1600° C.

5 Claims, No Drawings

TITANIUM DIOXIDE, A PROCESS AND ITS PRODUCTION

This application is a division of application Ser. No. 438,315, filed Nov. 20, 1989, now U.S. Pat. No. 5,009,879, issued Apr. 23, 1991.

This invention relates to titanium dioxide, to a process for its production and to its use as an opacifier in vitreous enamels and fusion enamels.

BACKGROUND OF THE INVENTION

Titanium dioxide is produced as a pigment either by reaction of $TiCl_4$ with $O_2$ or by hydrolysis of an aqueous solution of titanyl sulfate containing sulfuric acid and subsequent calcination.

In the case of the sulfate process, the titanium dioxide hydrate suspension is calcined for 5 to 20 hours in a rotary kiln. The deposit which accumulates during hydrolysis consists of fine particles having a specific BET surface of 50 to 500 $m^2/g$ which undergo extensive agglomeration during calcination.

The agglomerates formed as a result of calcination are in the form of 0.1 to 1.0 mm diameter particles which are made up of 0.2 to 0.4 $\mu m$ primary particles. This material is unsuitable as clinker or even as ground pigment for incorporation in vitreous enamels or fusion enamels because it agglomerates when mixed in dry form with the other constituents of the enamel frit, resulting in incomplete and inhomogeneous dissolution of the titanium dioxide during melting of the frit.

DE-AS 1 207 363 describes a process for the production of a $TiO_2$ product for incorporation in vitreous enamels by calcination of precipitated titanium dioxide hydrate. In this process, a precipitated titanium dioxide hydrate of coarse particle size, which consists of 5 to 20 $\mu m$ primary particles, is mixed with a precipitated titanium dioxide hydrate of fine particle size, which consists of primary particles mostly below 1 $\mu m$ in size, as obtained in the production of $TiO_2$ pigments, and the resulting mixture is calcined. The disadvantage of this process is that it is extremely expensive on account of the two different titanium dioxide hydrates which first have to be produced. In addition, the disadvantage of $TiO_2$ obtained in this way is that it is distinguished by a high apparent density of 1,4 to 2 kg/l and has a low specific surface of distinctly below 1 $m^2/g$, resulting in inadequate reactivity during melting in the frit.

U.S. Pat. No. 2,721,787 describes free-flowing, dust-free aggregates consisting of calcined anatase (primary particle size 0.2 to 0.3 $\mu m$, specific surface 4.5 to 9 $m^2/g$) and 0.1 to 3% of an inorganic binder. These aggregates are produced by spray-drying aqueous slurries of hydroclassified titanium dioxide pigments emanating from normal pigment production at a temperature in the range from 150° to 400° C. The disadvantage of this process is that calcined titanium dioxide pigments first have to be produced and are then taken up in water to form a slurry which is then spray-dried to obtain the claimed aggregates.

U.S. Pat. No. 3,018,186 describes a platelet-like titanium dioxide having a diameter of 1 to 20 $\mu m$ and a thickness of 0.01 to 0.5 $\mu m$ which is almost exclusively present in the rutile modification. These platelets are produced by calcining a titanyl sulfate solution containing at least 5% and at most 20% of sulfuric acid in a flame for 0.001 to 0.5 seconds at 800° to 1800° C. The material obtained is free from sulfuric acid and is used in ceramic and electrical materials, plastics and surface coatings and also as a filler. The titanyl sulfate solution used is expensive to intermediate product of the pigment production process. The solution formed by digestion of titanium ores contains considerable quantities of foreign elements, such as Fe, Al, Mg, etc.

BRIEF DESCRIPTION OF THE INVENTION

Accordingly, the problem addressed by the invention was to provide a suitable titanium dioxide which may be used as an opacifier for vitreous anamel and fusion enamels.

It has now been found that the titanium dioxide according to the invention satisfies the requirements stated above. This titanium dioxide comprises predominantly isometric primary particles 0.5 to 5.0 $\mu m$ in size, which are aggregated to predominantly spherolithic particles 1 to 1000 $\mu m$ in diameter, and has a BET surface of 1 to 4.5 $m^2/g$ and an apparent density of 0.2 to 1.3 kg/l. The BET surface is determined in accordance with German Industrial Standard DIN 66 131, Section 6, October 1973 (5-point method, measuring gas: nitrogen, adsoption at the temperature of boiling nitrogen, one molecule of nitrogen being assumed to occupy an area of 0.162 $nm^2$, pretreatment: heating for 1 hour in a stream of nitrogen at 130° C.

DETAILED DESCRIPTION OF THE INVENTION

The titanium dioxide according to the invention shows high stability, i.e. it does not disintegrate into fine grain during mixing. On the other hand, it is not particularly hard so that, in conjunction with its primary particle size of 0.5 to 5 $\mu m$ and specific surface of 1 to 4.5 $m^2/g$, the titanium dioxide shows excellent digestion behavior in the enamel melt. The agglomerated particles 1 to 100 $\mu m$ in size are uniformly distributed in the frit during mixing and then melt completely. Particularly favorable products are obtained when the $TiO_2$ according to the invention has an apparent density of from 0.2 to 0.8 kg/l.

In the quenched frit, the particle form near zones rich in titanium dioxide which act as seed cells for recrystallization of the titanium dioxide during the initial stages of firing of the enamel.

As firing of the enamel continues, anatase is almost exclusively formed in a suitable crystallite size, in isometric form and in uniform distribution, so that high reflectivity is obtained for excellent opacifying power.

In one particular embodiment, more than 50% by weight of the titanium dioxide according to the invention is present as rutile for a sulfate content below 0.5% by weight and preferably below 0.3% by weight, expressed as sulfate and based on titanium dioxide, and a titanium dioxide content above 90% by weight.

Residual water in quantities of up to 3% by weight, based on titanium dioxide, does not affect the quality of the product.

In another embodiment, the titanium dioxide contains oxides, phosphates and/or silicates of the metals Li, Na and/or K in a quantity of up to 0.5% by weight, based on titanium dioxide, and/or Mg, Ca, Sr, Ba, Sn, Sb, Bi, Y, Zr, Zn, V, Nb, W and/or Mo and/or oxides of the elements P and/or Si in a quantity of up to 10% by weight and preferably in a quantity of up to 5% by weight, based on titanium dioxide. For example, an addition of $P_2O_5$ improves the recrystallization of $TiO_2$ and, hence, opacity in the enamel, an addition of $WO_3$ improves color in the enamel and an addition of $K_2O$ in a quantity of up to 0.5% by weight and preferably in a quantity of from 0.1 to 0.2% by weight, based on $TiO_2$, improves digestion behavior in the frit and color in the enamel. The original spatial separation of the additives from the $TiO_2$ grain is surprisingly of considerable importance to the subsequent recrystallization of $TiO_2$, i.e. the direct introduction of the same additives in the same quantity would have a far weaker effect.

The present invention also relates to a suitable process for the production of the titanium dioxide according to the invention in which titanium dioxide hydrate having a BET surface of 50 to 500 m²/g is subjected to accelerated calcination for 0.1 to 60 seconds and at temperatures of 800° to 1600° C.

It is surprising in this regard that the accelerated calcination of the titanium dioxide hydrate at the temperatures mentioned above, despite the short reaction times, produces distinct crystal growth to predominantly isometric primary particles 0.5 to 5.0 μm in size and a substantially complete elimination of acid. The sintered primary particles are aggregated by sintering bridges to particles 1 to 100 μm in size which are not suitable for use as a pigment for coloring paints or plastics, but show excellent properties as an opacifier in enamels.

The $TiO_2$ hydrate may be introduced into the calciner in the form of an aqueous suspension through a one-component or multiple-component nozzle. However, the starting material may also be introduced into the calciner in the form of a paste-like mass or in the form of a dry powder. Suitable accelerated calciners are standard apparatus, such as hot gas spray reactors, reaction cyclones or flash calciners, for example, which are normally indirectly heated by gas. However, indirect heating is also possible.

The product is separated outside the calcination chamber, for example in a cyclone or an electrical or mechanical powder separator.

In one preferred embodiment, the $TiO_2$ hydrate is calcined for 0.1 to 5 seconds at 2000° to 1300° C.

Precipitated titanium dioxide hydrate containing up to 30% by weight of sulfate, based on titanium dioxide or containing sulfuric acid, as obtained for example during pigment production by the sulfate process, is preferably used as the starting material for accelerated calcination.

In one preferred embodiment, auxiliaries may be mixed in suitable form with the titanium dioxide hydrate before calcination, being present after calcination as oxides, phosphates and/or silicates of the elements Li, Na and/or K in a quantity of up to 0.5% by weight, based on titanium dioxide, and/or Mg, Ca, Sr, Ba, Sn, Sb, Bi, Y, Zi, Zn, V, Nb, W and/or Mo and/or as oxides of the elements P and/or Si in a quantity of up to 10% by weight and preferably in a quantity of up to 7% by weight, based on titanium dioxide.

Binders, such as for example waterglass, carboxymethyl celluloses or polyvinyl alcohols, and/or deflocculating agents, such as polyphosphates or polyacrylates for example, may also be added to the $TiO_2$ hydrate before calcination in quantities of 0.1 to 5% by weight.

A considerable advantage of the process is that the end product is directly obtained from a $TiO_2$ pigment precursor, a precipitated $TiO_2$ hydrate, in only one process step by inexpensive accelerated calcination.

The calcination of the $TiO_2$ hydrate is carried out in an oxidizing or reducing atmosphere. The advantage of calcination in a reducing atmosphere is that, where $TiO_2$ hydrate containing sulfuric acid is used, more $SO_2$ than $SO_3$ is present in the gaseous cleavage products formed from the sulfate during calcination. During the subsequent separation of the product outside the reaction chamber, $SO_2$ is not readsorbed onto the $TiO_2$ surface to the same extent as $SO_3$.

The titanium dioxide according to the invention may be used as an opacifier in the production of vitreous enamels or fusion enamels.

Examples 1 and 2 below are intended to illustrate the invention without limiting it in any way.

EXAMPLE 1

A titanium dioxide hydrate suspension having a $TiO_2$ content of 25.5% by weight, a sulfate content of 7.5% by weight, based on $TiO_2$, and a BET surface of 280 m²/g is calcined for 0.5 seconds at 1050° C. in a reducing atmosphere in a hot gas spray reactor. In the reaction chamber of the reactor, the suspension contacts hot carrier gas countercurrently with high turbulence thereby producing a very thoroughly blending of the hot gases with the entrained suspension. Dry titanium dioxide product is obtained outside the hot gase spray reactor in a cyclone separator. The product obtained consists predominantly of isometric particles approximately 0.5 μm in size which are mostly aggregated to spherolithic particles having a mean diameter of 13 μm. The BET surface is 3.1 m²/g, the apparent density 0.5 kg/l, the rutile component component 61%, the sulfate content 0.03%, based on $TiO_2$, and the $TiO_2$ content 99.5% by weight.

The product is non-tacky and shows excellent mixing and digestion behavior in a titanium boride white enamel frit. High reflectivity, high opacifying power and a favorable color of the enamel finish are obtained after application and firing.

EXAMPLE 2

1% by weight phosphoric acid, based on $TiO_2$, is added to a $TiO_2$ hydrate suspension as described in Example 1, followed by calcination for 0.5 seconds at 1080° C. in a reducing atmosphere. The product obtained consists predominantly of primary particles 0.7 μm in size which are mostly aggregated to spherolithic particles having a mean diameter of 16 μm. The BET surface is 2.8 m²/g, the apparent density 0.55 kg/l, the rutile component 76%, the sulfate content 0.02% by weight, based on $TiO_2$, and the $TiO_2$ content 99.0% by weight.

The product shows excellent mixing and digestion behavior in the enamel frit. Very high opacity and a blue-tinged color of the enamel are obtained after application and firing.

What is claimed is:

1. A process for the production of a titanium dioxide composition comprising $TiO_2$ particles predominantly in the form of isometric primary particles from 0.5 to 5.0 μm in size, which are aggregated to predominantly spherolithic particles 1 to 100 μm in a diameter, with a BET surface of 1 to 4.5 m²/g and an apparent density of 0.2 to 1.3 kg/l comprising subjecting titanium dioxide hydrate having a BET surface of from 50 to 500 m²/g to accelerated calcination for 0.1 to 60 seconds and at temperatures of 800° to 1600° C. in an oxidizing or reducing atmosphere.

2. A process as claimed in claim 1, wherein the $TiO_2$ hydrate is calcined for 0.1 to 5 seconds at temperatures of 100° to 1300° C.

3. A process as claimed in claim 2, the $TiO_2$ hydrate contains sulfuric acid.

4. A process as claimed in claim 1, wherein the $TiO_2$ hydrate contains sulfuric acid.

5. A process according to claim 1 wherein the titanium dioxide hydrate contains up to 30% by weight of sulfate, based on the weight of the titanium dioxide.

* * * * *